United States Patent [19]

Duwaer et al.

[11] Patent Number: 5,146,248
[45] Date of Patent: Sep. 8, 1992

[54] LIGHT VALVE PROJECTION SYSTEM WITH IMPROVED ILLUMINATION

[75] Inventors: Arne L. Duwaer, Ossining; Jill F. Goldenberg, Pelham Manor, both of N.Y.

[73] Assignee: North American Philips Corporation, New York, N.Y.

[21] Appl. No.: 282,849

[22] Filed: Dec. 9, 1988

Related U.S. Application Data

[63] Continuation-in-part of Ser. No. 137,049, Dec. 23, 1987, abandoned.

[51] Int. Cl.$^5$ .................................................. F21V 7/06
[52] U.S. Cl. ........................................ 353/122; 353/98; 353/37; 362/310; 359/49
[58] Field of Search ............... 353/122, 30, 31, 33, 353/98, 81; 362/310, 304, 301, 347, 349; 358/60, 61, 238, 231; 359/867, 869, 36, 49, 48

[56] References Cited

U.S. PATENT DOCUMENTS

| | | | |
|---|---|---|---|
| 2,367,475 | 1/1945 | Taylor | 362/349 |
| 2,604,005 | 7/1952 | Hahn | 353/98 |
| 2,747,460 | 5/1956 | Calvi | 353/33 |
| 3,676,667 | 7/1972 | Malifaud | 362/310 |
| 4,003,638 | 1/1977 | Winston | 350/628 |
| 4,334,734 | 6/1982 | Hareng et al. | 350/345 |
| 4,336,578 | 6/1982 | Bradley et al. | 362/310 |
| 4,368,963 | 1/1983 | Stolov | 353/31 |
| 4,382,656 | 5/1983 | Gilby | 350/96.28 |
| 4,735,495 | 4/1988 | Henkes | 350/345 |
| 4,765,718 | 8/1988 | Henkes | 350/345 |

FOREIGN PATENT DOCUMENTS 0155829  9/1984  Japan .................................. 350/345

*Primary Examiner*—Allan N. Shoap
*Assistant Examiner*—William C. Dowling

[57] ABSTRACT

A light valve projection system includes an illumination system having a light collector in the form of a non-imaging reflector with a rectangular input aperture and a rectangular output aperture. A two dimensional light source at the input aperture illuminates the output aperture substantially uniformly.

14 Claims, 3 Drawing Sheets

LIGHT VALVE PROJECTION SYSTEM WITH IMPROVED ILLUMINATION

This application is a continuation in part of application Ser. No. 137,049 filed Dec. 23, 1987.

The present invention relates to high efficiency collection optics and more particularly to a projection system with a combination of a light source and a reflector having a low maximum deviation angle, with respect to collimated light rays, to ensure collection by the rest of the optics in the system.

The possibility of using liquid crystal displays in projection television is well accepted, and several systems have been proposed. In an article on pages 375–377 of the 1986 issue of *Society of Information Display Digest*, Seiko Epson Corporation discloses a projection system including an illumination subsystem, a modulating device in the path of light emitted from the illumination subsystem, and a projection lens for projecting the image of the modulating device. More specifically, an illumination subsystem in the form of a halogen lamp and a spherical reflector projects light through a condenser lens to a pair of dichroic mirrors which split the light into its red, blue, and green components. Each beam component impinges a respective modulating device in the form of a liquid crystal display (LCD); a dichroic prism combines the three monochromatic images into a single color image which the projection lens projects onto a screen. The article states that the system offers the advantages of compactness, low cost, and brightness. Despite the latter claim, though, the overall light collection efficiency of the system is still less than 1%. That is, for a tungsten halide lamp producing 8800 lumens, less than 60 lumens reach the projection screen. This low efficiency is largely due to the fact that only a small percentage of the light rays is collected and directed toward the modulating device and the entrance pupil of the projection lens.

A further discussion of conventional illumination systems will be helpful. It is well known that a parabolic reflector with a point light source at the focal point of the parabola can provide collimated light beams, and thus offers a potentially high collection efficiency. However, lamps have finite source sizes which result in large deviation angles at the output aperture of a parabolic reflector. Even if a very small lamp is used, slight displacements from the focal point can result in additional deviation. Further, when the light valve and thus the reflector are small, it may be impossible to center the lamp at the focal point due to the finite envelope size. The most efficient refractive lens condensing systems are not as efficient (typically less than 43% efficiency) and require expensive multi-element lenses to limit deviation angles. In these refractive lens condensing systems, the envelope size of the lamp is not as important.

Further, when either a parabolic reflector or a refractive lens condensing system is used with a rectangular light valve such as an LCD for TV pictures, "fill factor" further diminishes efficiency. For example, for an LCD having a 4 to 3 aspect ratio, only 61% of a circumscribing circle representing the light beam is filled by the LCD. For a 5.33 to 3 aspect ratio as proposed for high definition television, the fill factor is only 54%.

From the foregoing it is apparent that it would be desirable to have a more highly efficient illumination system, that is, a system with far greater lumen output at the output of the reflector as a percentage of lumen output of the lamp. In order to improve the efficiency of the system as a whole, which is the luminous flux at the projection screen as a percentage of lumen output of the lamp, it will also be necessary to keep the maximum deviation angle of light emitted by the illumination system to a minimum. For a wide aperture F/2.0 projection lens, this maximum deviation angle would be 15°. Finally, since rectangular light valves in the form of LCD's will be used and it would be desirable to have a 100% fill factor, the illumination system should have a rectangular output aperture corresponding to the shape of the LCD.

SUMMARY OF THE INVENTION

According to the invention, the illumination subsystem includes a first non-imaging reflector having an input aperture, a rectangular output aperture, and a central Z axis in an XYZ coordinate system. The subsystem further includes a first light source situated outside the non-imaging reflector and illuminating the input aperture for illuminating the modulating device at least substantially homogeneously. The non-imaging reflector conserves the Etendue between the input aperture and the output aperture.

The use of non-imaging optics to efficiently collect sun light in solar energy applications is well known. See, for example, "The Optics of Non Imaging Concentrators", Welford and Winston, Academic Press, 1978. A typical non-imaging concentrator is a trough-shaped reflector with an input aperture, a smaller exit aperture, and opposed sidewalls extending therebetween. Substantially all of the incident energy received through the input aperture over a predetermined angle is reflected by the sidewalls onto an energy receiver such as a photovoltaic cell or a fluid carrying pipe positioned outside the reflector and adjacent the output aperture. Such a concentrator is disclosed in U.S. Pat. No. 4,003,638, which is incorporated by reference. This patent teaches a trough-like reflector having a cross-section with a compound parabolic shape, that is, each sidewall is profiled as part of a parabola having its focus on the opposite sidewall at the exit aperture.

The invention recognizes that non-imaging reflectors, heretofore used primarily in solar energy concentrators, are ideal for a light projection system having a collector with an output aperture which corresponds to the input aperture of a concentrator and vice versa. The deviation angle of light at the output aperture of such a collector thus has a well-defined limit, just as the input in a concentrator has a well-defined field of acceptance. The collector may thus be designed in conjunction with a given lamp to minimize deviation angle, making it possible to maximize efficiency when used in a projection system. Where the modulating device is a predetermined size, as is usually the case, the output aperture will also determine the shape of the reflector.

According to a preferred embodiment of the invention, the input aperture is likewise at least substantially rectangular, each pair of parallel edges of each aperture being parallel to a pair of parallel edges of the other aperture. This enables design of the reflector so that its output aperture coincides with the shape of a rectangular light valve, so that the fill factor is 100%. Preferably, the cross-section through the central axis of the reflector perpendicular to parallel edges across the widest dimension of the apertures is a compound parabola. The length of the reflector, size of the input aperture, and profile of the sidewalls is mathematically determined for the desired deviation angle. However, it is not possible to have the optimal compound parabola extending from the input aperture to the output aperture across the narrow dimension as well. The profile could be deformed, but this would increase the deviation angle.

According to a more preferred embodiment, therefore, the cross-section through the central axis across the narrowest dimension of the apertures comprises a compound parabola and parallel bounding surfaces adjacent the output aperture, the compound parabola extending between the input aperture and the parallel bounding surfaces. This extension of the output aperture in the narrowest dimension does not serve to alter the deviation angle, but increases the number of internal reflections. It is thus possible to maintain the predetermined deviation angle across each dimension of a rectangular output aperture. According to a variation on the preferred embodiment of the invention, the output aperture is extended in both the narrowest and widest dimension by parallel bounding surfaces.

For efficiency, the light source should have a two-dimensional output aperture, which can be achieved with a lamp in a reflective collector with an output aperture which coincides with the input aperture of the non-imaging reflector. The collector may or may not be a non-imaging reflector. Such a light source can be realized using an arc lamp with a reflective collector around it. All light rays emerging therefrom, even at deviation angles up to 90°, will emerge from the output aperture of the non-imaging reflector within the predetermined deviation angle. Another possibility is a planar phosphor based lamp, such as a cathode ray tube.

The projection system of the present invention has great utility in a color television projection system having three non-imaging reflectors and three light sources as described above for the preferred embodiments. The lamps are spectrally tuned to the red, blue and green portions of the visible spectrum, and the respective modulating devices are rectangular light valves placed immediately adjacent the output apertures. The system further comprises means for combining the images of the light valves for projection by the projection means. The preferred combination means, in the case of broadband spectrally tuned lamps, is a dichroic prism system of a type well known for color television cameras. See, e.g. "Colour Separation in Colour-Television Cameras", Lang and Bouwhuis, Philips Technical Review, Volume 24, 1962/63, No. 9. Where the system is designed for a maximum deviation angle of 15° at the output aperture, the projection means is an F/2.0 lens.

In another embodiment of the present invention, one non-imaging reflector and one white light source is used in combination with known color separation methods using dichroic mirrors and intermediate lenses.

The present invention is closely related to companion U.S. Application Ser. No. 137,048 entitled, "Light Valve Projection System with Non-Imaging Optics for Illumination", the teaching of which is hereby incorporated by reference.

DETAILED DESCRIPTION OF THE PREFERRED EMBODIMENT

Figure 1:
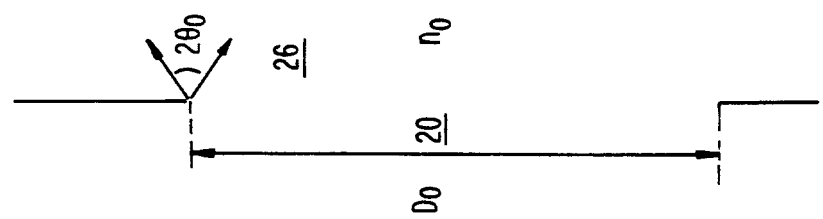
FIG. 1 is a schematic of the input and output apertures of a light collector.
Figure 1:
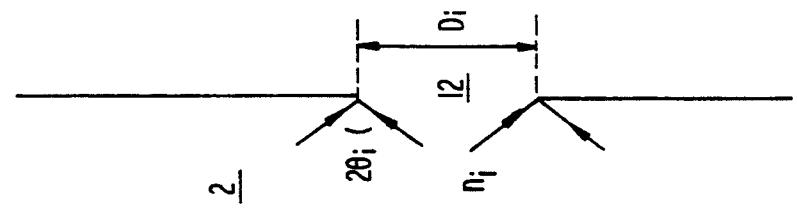

Referring to FIG. 1, the theory of the present invention will be discussed. The collection optics in a projection system collect light rays coming from a light source 2 through an input aperture 12 of dimension $D_i$ with a large range of angles of incidence up to $2\theta_i$. The goal is to homogeneously illuminate a large output aperture 20 of dimension $D_o$ with a smaller range of emission angles up to $2\theta_o$. In the ideal case of no energy loss, the energy flowing into the collector will flow out of the collector. This occurs if there are no obstructions of the light beam and no losses due to transmission absorption or back scattering, in which case a light valve 26 adjacent aperture 20 will receive all the energy of the light source 2.

The LaGrange invariant or Etendue of any optical system is defined as the product of the area of the light beam normal to the direction of propagation, and the solid angle over which the beam extends (see "The Optics of Non-Imaging Concentrators", supra). Therefore, for a light collector having an input aperture with an area $A_i$ and an output aperture with an area $A_o$, the Etendue is conserved when the following relationship is satisfied:

$$A_i n_i \Omega_i = A_o n_o \Omega_o$$

where $\Omega_i$ and $\Omega_o$ represent the solid angle of the respective input and output beams and $n_i$ and $n_o$ are refractive indices in the respective input and output spaces.

For a one-dimensional system, as shown in FIG. 1, $$D_i n_i \sin \theta_i = D_o n_o \sin \theta_o$$

For a rotationally symmetric system, $$(D_i n_i \sin \theta_i)^2 = (D_o n_o \sin \theta_o)^2$$

where $D_i$ and $D_o$ are the diameters of the input and output apertures.

Similarly, if the input and output apertures are rectangular, Etendue is conserved if $$n_i^2 D_{ix} D_{iy} \sin \theta_{ix} \sin \theta_{iy} = n_o^2 D_{ox} D_{ox} \sin \theta_{oy} \sin \theta_{oy}$$

where the aperture dimensions are indicated by $D_{ix}$, $D_{iy}$ and $D_{ox}$, $D_{oy}$, the maximum angles of incidence are given by $\theta_{ix}$ and $\theta_{iy}$, and the maximum angles of emission are given by $\theta_{ox}$ and $\theta_{oy}$.

If the aspect ratios of rectangular input and output angles are equal, then $$n_i D_{ix} \sin \theta_{ix} = n_o D_{ox} \sin \theta_{ox}$$

$$n_i D_{iy} \sin \theta_{iy} = n_o D_{oy} \sin \theta_{oy}$$

In the case of a planar light source with the widest range of input angles possible (−90 to +90° degrees), and $n_i = n_o = 1$, $$D_{ix} = D_{ox} \sin \theta_{ox}$$

$$D_{iy} = D_{oy} \sin \theta_{oy}$$

For the special case where the exit aperture of the light source 2 coincides with input aperture 12 of the collector ($D_1 = D_i$ and $D_{iy} = D_{iy}$), and the output aperture 20 of the collector coincides with the light valve 26 ($D_{ox} = D_{vy}$ and $D_{oy} = D_{vy}$), $$D_{ix} = D_{vx} \sin \theta_{ox}$$

$$D_{iy} = D_{vy} \sin \theta_{oy}$$

Figure 2A:
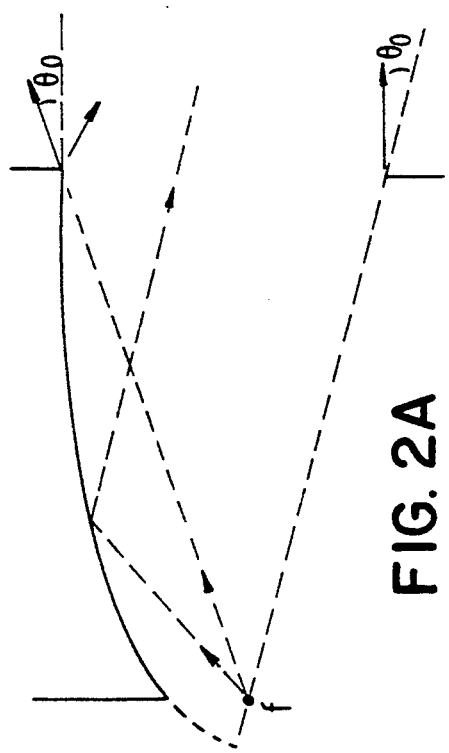
FIG. 2A is a schematic of a portion of a parabola.
Figure 2B:
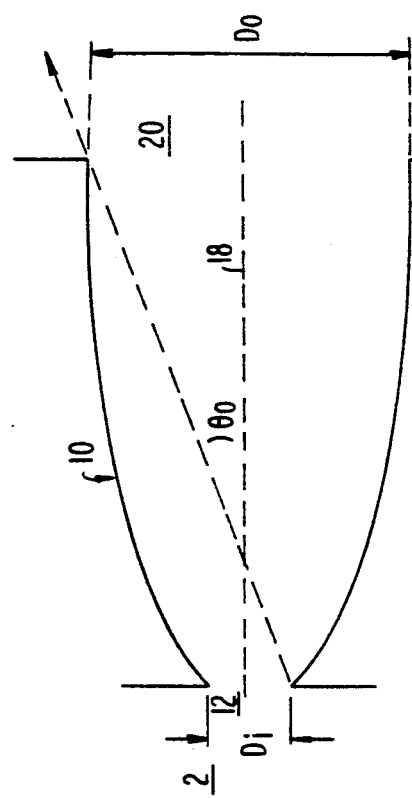
FIG. 2B is a schematic of the corresponding compound parabola.

Referring to FIGS. 2A and 2B, a reflector shape for each of the x and y dimensions for maximum collection efficiency and for conservation of Etendue is the compound parabolic reflector. The shape is determined by the requirement that all rays exiting at the output aperture with maximum angle $\theta_o$ should originate from the opposite edge of the input aperture. As shown in FIG. 2A, a parabolic shape with its axis parallel to the direction $\theta_o$ and its focus f on the opposite edge will accomplish this. As shown in FIG. 2B, a rotationally symmetric reflector is obtained by rotating the parabola about the reflector axis (not about the axis of the parabola).

The compound parabola of FIG. 2B is also representative of the cross-section of a one dimensional reflector (such as the troughs in U.S. Pat. No. 4,003,638) or each dimension of a rectangular reflector.

Figure 4:
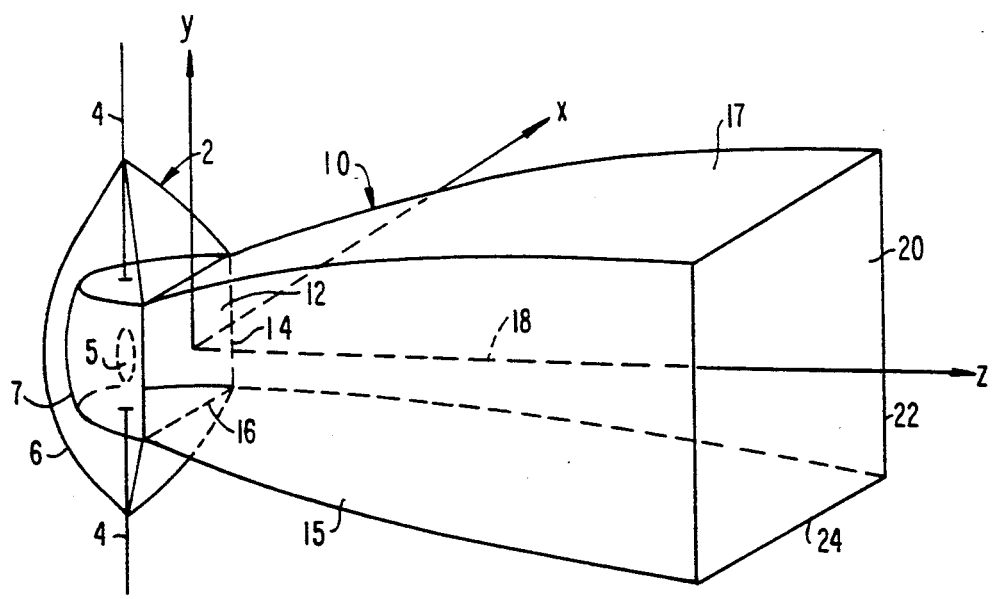
FIG. 4 is a schematic perspective of one embodiment of the invented light-valve illumination system.

In the preferred embodiment of a projection system according to the invention, as shown schematically in part in FIG. 4, the illumination subsystem 10 uses compound parabolic reflector shapes to achieve the maximum possible collection with a sharply defined distribution of the light rays exiting the reflector at the output aperture 20. The light source is adapted to meet the requirements of this reflector. Viewing such a subsystem in cross section, the light source 2 emits its rays through a 2-dimensional aperture that coincides with the input aperture of the reflector. The light entering the input aperture 12 of the reflector 10 should have an angular distribution substantially larger than $\pm(\theta_{oy}, \theta_y)$ in order to obtain homogeneous illumination of the output aperture 20. Preferably $\theta_{iy}$ and $\theta_{iy}$ are limited to $\pm 75$ degrees because Fresnel losses increase rapidly beyond these values. See "Fundamentals of Optics", Jenkins and White, McGraw-Hill (1976) p. 525. A reflective collector 7 is also provided around the actual light source, typically a metal-halide lamp with an arc 5 of 1 mm diameter and 3-6 mm length between electrodes 4. This can be realized with a reflective surface 7 either inside, on, or outside of the envelope 6 of the lamp 2.

Referring still to FIG. 4, the maximum size of the exit aperture 12 of the light source 2 is determined by the size of the light valve to be illuminated and the maximum allowable value for $\theta_{ox}$ and $\theta_{oy}$ (commonly represented by $\theta_o$ in FIG. 2). A wide aperture F/2.0 projection lens can give excellent performance for television signals when combined with a special color combination or separation system for red, green, and blue channels. See "Color Separation in Color Television Cameras", supra. An F/2.0 lens corresponds to $\theta_o = \theta_{ox} = \theta_{oy} = \pm 15$ degrees in air.

If a rectangular light valve with a 4:3 aspect ratio is used, and the light valve coincides with the output aperture 20 of reflector 10, and an F/2.0 lens is used, the required diagonal $D_1$ of the exit aperture of the lamp and the diagonal $D_v$ of the light valve is $$D_1 = D_v \sin 15° = 0.259 D_v$$

Figure 3:
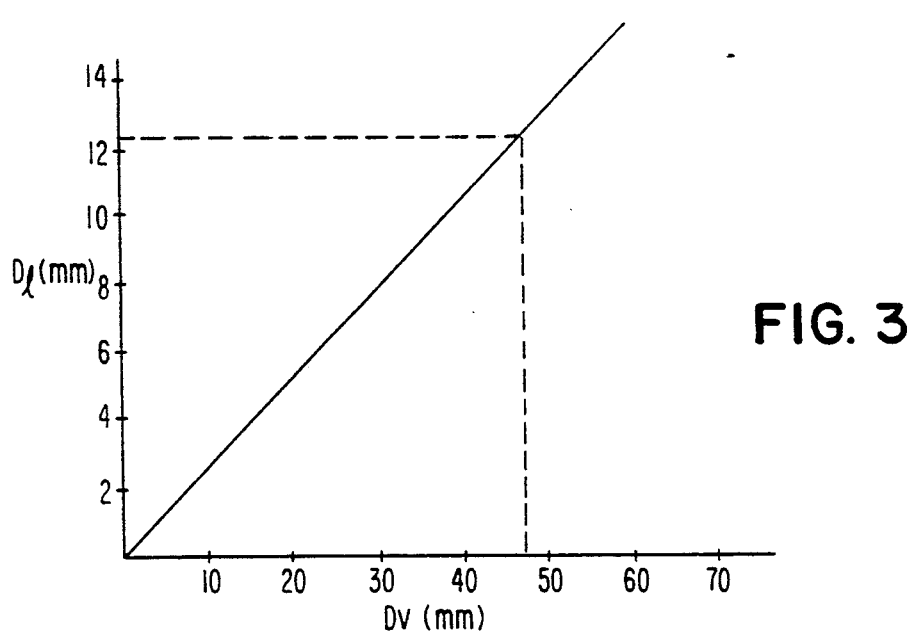
FIG. 3 is a plot of the diagonal at the exit aperture of the light source versus the diagonal of the light valve for ideal collection.

This results from Etendue as derived above and is plotted in FIG. 3. Since a typical light valve diagonal is 48 mm (1.8 in.), this dictates that the diagonal of the exit aperture of the light source should equal 12 mm if energy losses are to be minimized, that is, if Etendue is conserved.

Referring again to FIG. 4, non-imaging reflector 10 has a cross-section through its central axis 18 across the widest orthogonal dimension of apertures 12 and 20 which is a compound parabola bounded by opposed sidewalls 15 of the reflector. This is the XZ plane. The cross-section through the central axis 18 across the narrowest dimension of apertures 12, 20 is bounded by opposed sidewalls 17. This is the YZ plane. However, the profile of a compound parabola required for the 15° output angle cannot be achieved in this section by a compound parabola extending inclusively between the apertures 12, 20, because its length would be smaller then the length of the compound parabolic reflector in the XZ plane. The problem is readily solved by having sidewalls 17 extend in parallel toward the output aperture 20. This results in additional reflections without increase of output angle $\theta_o$. Where a longer reflector is desired without increasing the size of output aperture 20, the sidewalls 15 may likewise be extended in parallel, essentially forming a light pipe.

The reflector 10 could be filled with a dielectric and could be optically coupled to the envelope of the lamp. This would eliminate losses that would occur due to total internal reflection (TIR) at the envelope/air interface of the light source output aperture 12. At the output aperture 20, the angles are smaller than the critical angle so that TIR does not occur. Coatings with high reflection can be put on selected parts of collector 10 to reduce losses due to absence of TIR for rays approaching the input aperture 12 at small angles of incidence. The collector 10 could consist of two parts with mutual optical coupling: one piece attached to lamp envelope 6 and made of quartz to resist high temperatures, and a second piece of lower cost material. Of course, a dielectric filled reflector has to be designed for an angle $\theta_o'$ given by $$\sin \theta_o' = (\sin \theta_o)/n_c$$

where $n_c$ is the refractive index of the dielectric.

The illumination system could contain means to change the luminance distribution in the output aperture 20, like diffusers and additional reflective surfaces or lenses.

Figure 5:
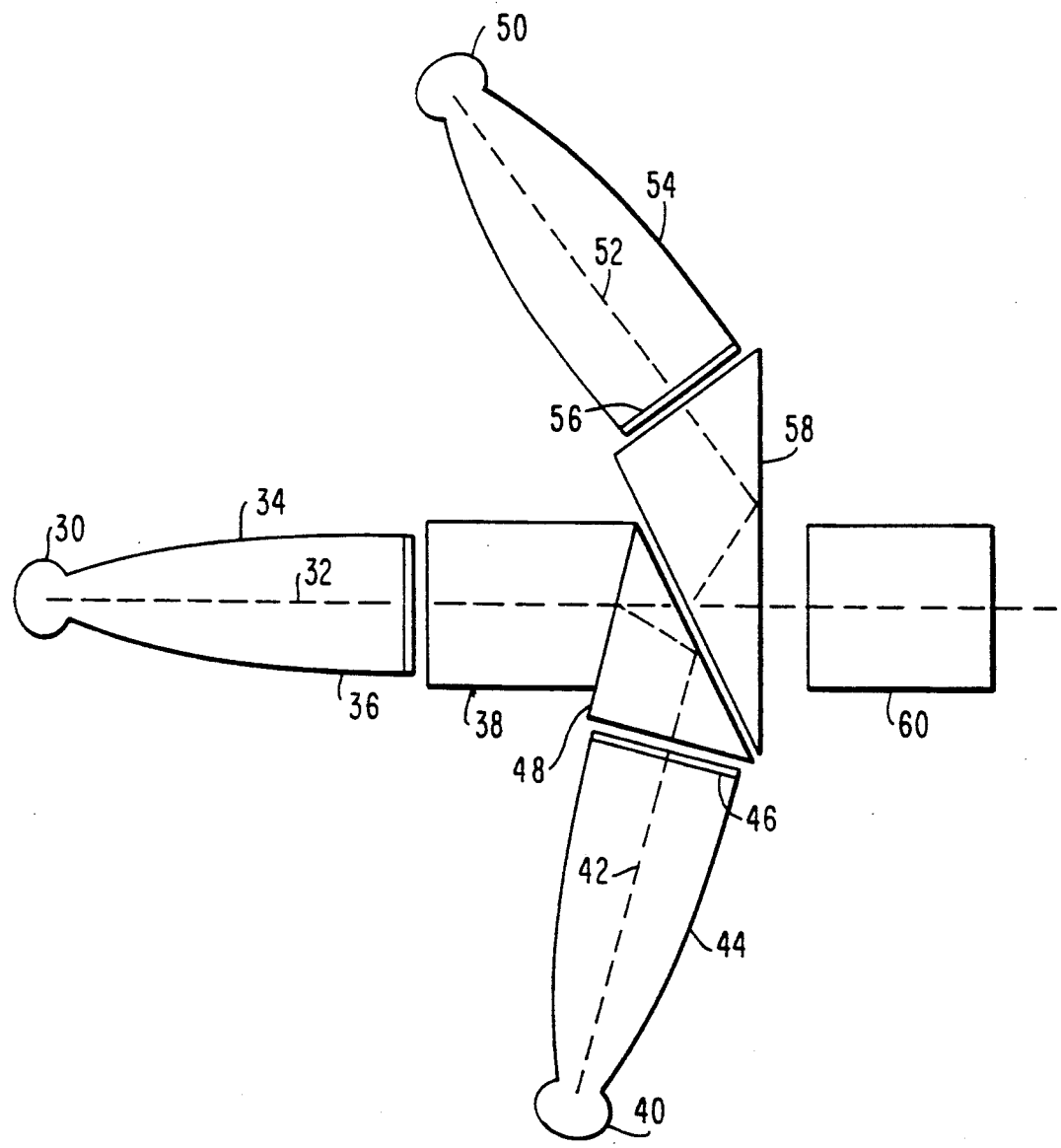
FIG. 5 is a schematic plan view of a color projection system with three light sources.

FIG. 5 shows a color television system having three lamp/reflector units of the type shown in FIG. 4. Three lamps 30, 40, 50 are tuned to the green, red, and blue channels respectively. Since light collection is based on reflection instead of refraction, the reflectors 34, 44, 54, which illuminate light valves 36, 46, 56 can be identical. The prisms 38, 48, 58 comprise the Philips color combination prism system, supra, which can tolerate angles of $\pm 15°$ in air. Both the collection system and the F/2.0 projection lens 60 are designed for this angle. The central axes 32, 34, 52 of the respective green, red and blue light beams are shown.

While the example of a lamp in conjunction with a reflector has been discussed, other light sources are possible. For example, a cathode ray tube having a screen coinciding with the input aperture of the reflector would provide uniformity and intensity suitable for practicing the invention. Likewise, other forms of non-imaging reflector than the compound parabolic reflector could be used. Each form of non-imaging reflector has its own characteristics. For example, the compound parabolic shape is especially suitable when uniform illumination of the output aperture is desired. This is the case when the modulating device is at the output aperture. However, some non-imaging reflectors can provide substantially homogeneous illumination in more remote planes. A compound elliptical reflector, for example, can illuminate a planar area remote from the output aperture substantially homogeneously. Thus, it may be suitable where the modulating device is remote from the output aperture.

The foregoing is exemplary and not intended to limit the scope of the claims which follow.

What is claimed:

1. A projection system of the type comprising a first illumination subsystem, a first rectangular modulating device in the path of light emitted by said illumination subsystem, and a projection means for projecting the image of said modulating device, characterized in that said illumination subsystem comprises a first non-imaging reflector having a rectangular input aperture defining an XY plane, a rectangular output aperture, and a central Z axis of an XYZ coordinate system, said subsystem further comprising a first light source situation outside said non-imaging reflector and illuminating the input aperture thereof for illuminating the modulating device at least substantially homogeneously said non-imaging reflector satisfying the relationship $D_{ix}n_i\sin\theta_{ix}=D_{ox}n_o\sin\theta_{ox}$ and $D_{iy}n_i\sin\theta_{iy}=D_{oy}n_o\sin\theta_{oy}$, where $D_{ix}$ and $D_{iy}$ are the dimensions of the input apertures, $\theta_{ix}$ and $\theta_{iy}$ are the maximum angles of incidence, $D_{ox}$ and $D_{oy}$ are the dimensions of the output aperture, $\theta_{ox}$ and $\theta_{oy}$ are the maximum emission angles, $n_i$ is the index of refraction at the input aperture, and $n_o$ is the index of refraction at the output aperture.

2. A projection system as in claim 1 wherein a cross-section of the reflector take in the XZ plane traverses the widest orthogonal dimension of the rectangular apertures and comprises a compound parabola.

3. A projection system as in claim 2 wherein the cross section of the reflector taken in the YZ plane, also comprises a compound parabola and further comprises parallel bounding surfaces adjacent said output aperture, the compound parabola of said cross section in the YZ plane extending between said input aperture and said parallel surfaces.

4. A projection system as in claim 1 wherein said light source comprises a reflective collector having a lamp therein and having an output aperture which coincides with the input aperture of said non-imaging reflector.

5. A projection system as in claim 1 wherein the deviation angle of light exiting from said output aperture is less than or equal to 15°.

6. A projection system as in claim 1 wherein said first modulating device is immediately adjacent said output aperture, said output aperture being illuminated at least substantially uniformly.

7. A projection system as in claim 1 further comprising
respective second and third non-imaging reflectors defined as said first non-imaging reflector,
second and third rectangular modulating devices outside of respective second and third reflectors and illuminating the input apertures thereof,
second and third modulating devices in the path of light emitted by the output apertures of respective second and third reflectors, and
means for combining the images of said modulating devices for projecting by said projection means.

8. A projection system as in claim 7 wherein for each reflector a cross-section taken through the central axis across the widest orthogonal dimension of the rectangular apertures comprises a compound parabola.

9. A projection system as in claim 8 wherein for each reflector the cross-section taken across the shortest dimension of the rectangular apertures also comprises a compound parabola and further comprises parallel bounding surfaces adjacent the respective output aperture, the compound parabola of said cross-section extending between the respective input aperture and said parallel surfaces.

10. A projection system as in claim 7 wherein each said light source comprises a reflective collector having a lamp therein and having an output aperture which coincides with the input aperture of said non imaging reflector.

11. A projection system as in claim 8 wherein said lamps are respectively spectrally tuned to the red, blue, and green portions of the visible spectrum.

12. A projection system as in claim 10 wherein said means for combining the images of said modulating devices comprises a dichroic prism system.

13. A projection system as in claim 7 wherein the deviation angle of light exiting from said output aperture of said reflector is less than or equal to 15°.

14. A projection system as in claim 13 wherein said projection means comprises an F/2 projection lens.

* * * * *